US006868678B2

(12) United States Patent
Mei et al.

(10) Patent No.: US 6,868,678 B2
(45) Date of Patent: Mar. 22, 2005

(54) NON-INTRUSIVE REFRIGERANT CHARGE INDICATOR

(75) Inventors: Viung C. Mei, Oak Ridge, TN (US); Fang C. Chen, Knoxville, TN (US); Esher Kweller, Rockville, MD (US)

(73) Assignee: Ut-Battelle, LLC, Oak Ridge, TN (US)

( * ) Notice: Subject to any disclaimer, the term of this patent is extended or adjusted under 35 U.S.C. 154(b) by 71 days.

(21) Appl. No.: 10/106,556

(22) Filed: Mar. 26, 2002

(65) Prior Publication Data

US 2003/0182950 A1 Oct. 2, 2003

(51) Int. Cl.$^7$ .............................................. F25B 49/00
(52) U.S. Cl. ........................................ 62/126; 62/129
(58) Field of Search ............................ 62/125, 126, 129, 62/208; 73/19.1, 52

(56) References Cited

U.S. PATENT DOCUMENTS

| | | | |
|---|---|---|---|
| 3,153,913 A | 10/1964 | Brody | |
| 4,114,448 A | 9/1978 | Merritt | |
| 4,138,856 A * | 2/1979 | Orlowski | 62/181 |
| 4,829,777 A * | 5/1989 | Matsuoka et al. | 62/212 |
| 5,152,152 A * | 10/1992 | Brickner et al. | 62/126 |
| 5,301,514 A * | 4/1994 | Bessler | 62/126 |
| 5,454,229 A * | 10/1995 | Hanson et al. | 62/126 |
| 5,457,965 A * | 10/1995 | Blair et al. | 62/129 |
| 5,481,884 A * | 1/1996 | Scoccia | 62/129 |
| 5,557,938 A * | 9/1996 | Hanson et al. | 62/126 |
| 5,579,648 A * | 12/1996 | Hanson et al. | 62/126 |
| 5,586,445 A | 12/1996 | Bessler | |
| 5,934,087 A * | 8/1999 | Watanabe et al. | 62/126 |
| 5,987,903 A * | 11/1999 | Bathla | 62/129 |
| 6,058,719 A | 5/2000 | Cochran | |
| 6,293,114 B1 * | 9/2001 | Kamemoto | 62/129 |
| 6,330,802 B1 * | 12/2001 | Cummings et al. | 62/129 |
| 6,354,093 B2 * | 3/2002 | Davis et al. | 62/89 |
| 6,463,747 B1 * | 10/2002 | Temple | 62/129 |

FOREIGN PATENT DOCUMENTS

| | | | |
|---|---|---|---|
| EP | 0 319133 A2 * | 6/1989 | |
| JP | 11211292 A * | 8/1999 | |
| JP | 02002277116 A * | 9/2002 | |

OTHER PUBLICATIONS

*Refrigerant Tables and Charts, ASHRAE Fundamental Handbook,* pp. 17.15 and 17.23, 1989, ASHRAE, Atlanta, GA.

* cited by examiner

*Primary Examiner*—William E. Tapolcai
*Assistant Examiner*—Mohammad M. Ali
(74) *Attorney, Agent, or Firm*—Akerman Senterfitt (57) ABSTRACT

A non-intrusive refrigerant charge level indicator includes a structure for measuring at least one temperature at an outside surface of a two-phase refrigerant line section. The measured temperature can be used to determine the refrigerant charge status of an HVAC system, and can be converted to a pressure of the refrigerant in the line section and compared to a recommended pressure range to determine whether the system is under-charged, properly charged or over-charged. A non-intrusive method for assessing the refrigerant charge level in a system containing a refrigerant fluid includes the step of measuring a temperature at least one outside surface of a two-phase region of a refrigerant containing refrigerant line, wherein the temperature measured can be converted to a refrigerant pressure within the line section.

24 Claims, 5 Drawing Sheets

R-22 charge vs evaporator pressure for an off-the-shelf air conditioner

FIG. 4

R-22 charge vs evaporator temperature for an off-the-shelf air conditioner

FIG. 5

NON-INTRUSIVE REFRIGERANT CHARGE INDICATOR

STATEMENT REGARDING FEDERALLY SPONSORED RESEARCH OR DEVELOPMENT

The United States Government has rights in this invention pursuant to Contract No. DE-AC05-000R22725 between the United States Department of Energy and UT-Battelle, LLC.

FIELD OF THE INVENTION

The invention relates to the field of heating and cooling, and more particularly, to apparatus and methods for determining refrigerant charge levels in refrigerant based heating and cooling systems.

BACKGROUND OF THE INVENTION

A typical refrigerant based heating or cooling system, such as an air conditioning or heat pump, generally includes several principal mechanical components. These components include a compressor, a condenser coil and fan and an evaporator coil and fan. A chemical refrigerant is the working fluid which is designed to circulate in a closed loop within the system. In the case of a heat pump, the system may include one or more reversing valves to permit switching between heating and cooling modes.

Maintenance of an appropriate level of refrigerant charge in refrigerant based heating or cooling systems is important for efficient operation of the system. If the refrigerant charge level in the equipment is too low, such as due to a refrigerant leak, large reductions in system capacity and efficiency may result, up to 30% or more being possible. In addition, knowledge of the refrigerant level permits diagnosing leaks and other system problems.

Refrigerant leakage can cause many problems. First, the release of some refrigerants into the environment are believed to result in environmental damage, such as an increase in the greenhouse effect. Second, when the refrigerant charge becomes insufficient, the reliability and cooling performance of the system suffers. Thus, a refrigerant based system having a low charge is inefficient. Thus, there is significant interest in developing systems and methods for detecting low refrigerant charges.

Unfortunately, conventional approaches for determining proper refrigerant charge may require complex valve arrangements and other components, may be cumbersome, and may be intrusive to the refrigerant system. These approaches may also be unreliable and inaccurate.

Moreover, some approaches are designed for exclusive use by service professionals. For example, one approach for determining proper refrigerant charge in a heat pump is disclosed in U.S. Pat. No. 3,153,913 to Brody entitled "Refrigeration System Including Charge Checking Means". Brody discloses a sight glass in a refrigerant charge container which is connected between two heat exchangers of a heat pump. A portion of the refrigerant charge is stored in the container during the heating cycle, while the container also has a total capacity capable of containing substantially the entire optimum liquid refrigerant charge. The heat pump requires control means for controlling the pressure differential between the two heat exchangers, with a smaller circulating charge being desired on the heating cycle than on the cooling cycle. The container is connected between the indoor heat exchanger and flow restricting means. The container provides means for obtaining a difference in the effective or circulating charge of refrigerant on the heating and cooling cycles of operation of the heat pump.

To check the charge, the heat pump is operated in the cooling mode and a normally open valve provided in the line connecting the indoor heat exchanger with the container is closed, while a normally closed valve in the charge checking conduit is opened. Closing the valve prevents flow of liquid refrigerant to the indoor heat exchanger. The liquid refrigerant flowing into the container can no longer flow into the indoor heat exchanger, while any liquid refrigerant contained in the indoor heat exchanger will be evaporated and returned to the compressor through the low pressure conduits.

The refrigerant condensed in the indoor heat exchanger during the charge checking cycle flows through a capillary into the container where it is maintained in a liquid state by pressure. During the charge checking, any liquid refrigerant stored in any lower pressure portion of the system is transferred to the container. In addition, the sight glass is positioned in an upper portion of the container at the location of the desired liquid/gas interface level. Because it may be difficult to observe the liquid/gas interface with positive accuracy, another valve may be closed to prevent reverse flow of refrigerant from the container and the compressor so that a static reading is obtained. After the proper amount of charge is determined, the various valves are returned to their normal operating positions. In addition, the flow restrictor substantially reduces the refrigerant flow through the system during the charge measuring cycle relative to the flow under ordinary operation.

Brody requires operation in the cooling mode, a special container, manipulation of several valves, and other complexities to obtain an indication of a desired liquid/gas interface level relating to the refrigerant charge. The apparatus is complex and the procedure is cumbersome.

More generally, for systems which use a sight glass, the degree of under-charge must be severe to generally produce bubbles in the liquid line. Accordingly, when bubbles in the liquid line are used to detect under-charge of refrigerant, the system usually has been operated in an under-charged condition for a fairly lengthy period of time.

U.S. Pat. No. 4,114,448 to Merritt (Merritt) entitled "Service Apparatus" discloses an apparatus for servicing refrigeration systems which avoids breaking into a refrigeration line for the purpose of measuring refrigerant pressures. An added feature is the ability of the apparatus to provide either absolute temperature read-outs for the temperature at desired locations, or a differential temperature read-out for the temperatures between two desired locations. Moreover, the disclosed apparatus permits vacuum read-outs and pressure read-outs, again without the necessity of breaking into the refrigeration lines.

Merritt has limited utility as it is designed as a service tool. Usually by the time a service person is called, most of the refrigerant in the system is probably gone already. Merritt does not alert an owner of a developing refrigerant leak. In addition, Merritt uses the ideal gas law (PV=nRT) to relate refrigerant pressure to the measured refrigerant temperature. Thus, his measurements are performed in system locations where the refrigerant is in the vapor or gas form, rather than in the two-phase region, because the ideal gas law does not apply in liquid-vapor two-phase regions.

Other conventional approaches for determining proper refrigerant charge include a complete purge and measured refill of refrigerant for the apparatus, or the commonplace method of attaching gauges, taking pressure readings, obtaining indoor and outdoor temperatures, and applying the data so obtained to the equipment manufacturer's charging chart. These methods are generally all very cumbersome and time-consuming. Thus, conventional approaches for determining proper refrigerant charge have significant shortcomings.

SUMMARY OF THE INVENTION

A non-intrusive indicator for measuring charging levels of a refrigerant in a refrigerant based heating or cooling system includes a temperature sensor for measuring at least one temperature at an outside surface of a two-phase refrigerant line section. Under normal operation, two-phase refrigerant regions are generally limited to portions of both the evaporator and condenser coil. The invention can provide real-time refrigerant charge levels for air conditioning, heat pump and other refrigeration systems. The indicator can also be used to determine an amount of refrigerant which has been lost, or an amount of system overcharge.

The refrigerant charge level indicator can include a structure for converting the temperature to a corresponding pressure of refrigerant in the two-phase line section. The indicator can include a structure for measurement of the ambient temperature, wherein the structure for converting can include the ambient temperature in the conversion of refrigerant temperature and pressure in the two-phase line section.

The refrigerant temperature can be measured at a condenser coil surface, such as at a discharge of the condenser. Alternatively, the refrigerant temperature can be measured at an evaporator coil.

The pressure of refrigerant can be determined exclusively using an evaporator coil temperature. Thus, in this embodiment, an ambient temperature value is not generally required. Refrigerant temperatures can also be measured simultaneously at both the condenser coil and the evaporator coil.

The structure for converting the temperature to a corresponding pressure of refrigerant can include a data processing device, such as an integrated circuit. The integrated circuit can include a recommended pressure range for the applicable refrigerant stored within, such as in memory, wherein the data processing device can compare the measured refrigerant pressure to the recommended pressure range for the particular refrigerant. The indicator can include a structure for generating at least one output signal to indicate when the refrigerant pressure is outside a recommended pressure range. The output signal can be an audio or a visual signal.

A refrigerant based heating or cooling system includes a compressor, a condenser and an evaporator, the respective components fluidicly connected by a refrigerant line filled with a refrigerant fluid. The refrigerant based system can be an air conditioning system or heat pump system. A structure for measuring at least one temperature at an outside surface of a two-phase region of the refrigerant line is also provided.

The system can include a data processing device for converting the refrigerant temperature to a refrigerant pressure. The system can also include a structure for measurement of ambient temperature, wherein the data processing device converts a differential temperature measurement including the ambient temperature to a corresponding refrigerant pressure.

The refrigerant based heating or cooling system can serve movable volumes, such as aircraft, cars, trucks, trains and a water going vessels. The system can also serve non-movable volumes, such as buildings.

A non-intrusive method for assessing the refrigerant charge level in a system containing a refrigerant fluid includes the step of measuring at least one temperature at an outside surface of a two-phase region of a refrigerant containing refrigerant line. The method can include the step of converting the temperature to a refrigerant pressure.

The method can include the step of measuring an ambient temperature, wherein the converting step includes the ambient temperature in conversion of refrigerant temperature to refrigerant pressure. The method can include the step of generating at least one output signal to indicate when the refrigerant pressure is outside a recommended pressure range.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

The invention can provide real-time refrigerant charge levels in air conditioning, heat pump and other refrigeration systems. Absolute charge levels may also be determined using the invention. As used herein, the term "refrigeration system" refers to heating, ventilation, air-conditioning, and refrigeration (HVAC/R) systems generally, such as refrigerators, HVAC systems such as air conditioners and heat pumps and other systems which produce a heating or cooling effect using a refrigerant fluid. The refrigeration system can be stationary system, such as for serving movable volumes, including aircrafts, cars, trucks, trains and a water going vessels. The system can also serve non-movable volumes, such as buildings. The apparatus can be integrated into new or existing refrigeration systems. Alternatively, the invention can be a portable, stand-alone device.

Much of the difficulty in measuring refrigerant levels relates to the time it takes to verify that a system is properly charged. This is most obvious in split system air conditioners or heat pumps where the refrigerant distribution system is installed in the field and the refrigerant lines may be in the range of fifty feet long, or more.

A low refrigerant level in a refrigeration system such as an air conditioner is currently not generally identifiable until the system no longer provides any measurable cooling. In this condition, the air-conditioning system has generally already lost most of its refrigerant charge to the ambient, which is wasteful and environmentally undesirable.

A charge indicator installed with the equipment has the potential to substantially reduce the cost of verifying proper refrigerant charge levels. The charge indicator can be incorporated into new or existing HVAC/R products for system monitoring. Refrigerant level monitoring can result in substantial energy savings, lengthening of system life and protection of the environment through early detection of leaks, which result in improper refrigerant charge levels. The charge indicator preferably includes a signal output device, such as a visual or audio warning signal, to indicate the need for prompt action when the system is undercharged or leaking.

The invention is based on the discovery that refrigerant pressures in two-phase regions of the refrigerant loop can be obtained from measurement of the refrigerant temperature in these regions. The term "two-phase" as used herein refers to refrigerant existing in both a liquid and gaseous state at one or more sections of the refrigerant loop. For example, the high-side and low-side refrigerant pressures of the evaporator and condenser can be determined non-intrusively by measuring the two-phase refrigerant temperatures in at least one location in these coils.

Based on single element refrigerant thermodynamic properties, fluid pressure and temperature can be determined if one of the quantities, pressure or temperature is known, provided the refrigerant region of the cooling (or heating) loop is in a two-phase condition. Thus, if one of the temperature and pressure of refrigerant can be obtained in any of these regions, the other parameter can be determined.

In one embodiment of the invention, the system charge status is determined by just measuring one temperature, such as the evaporator two-phase refrigerant temperature. In this embodiment, proper charging levels will be characterized by a range of refrigerant temperatures, the proper temperature range depending principally on the specific refrigerant and system used.

Although not required to practice the invention, in some applications it may be desirable to convert the measured refrigerant temperature to a corresponding refrigerant pressure, such as through use of the manufacturers' charging chart or an equation characteristic of the particular refrigerant fluid used. For example, the saturation pressure for refrigerants can be calculated by the following equation (hereinafter referred to as the "temperature conversion equation") from measured coil temperatures, which was derived by curve fitting the saturated pressure as a function of the saturated temperature for R-22 and R-134-A from respective refrigerant property tables (see Refrigerant Tables and Charts, ASHRAE Fundamental Handbook, pp 17.15, 1989, ASHRAE, Atlanta, Ga.). Curve fitting programs are generally available to convert sets of discrete data points into an equation.

A third order equation for the saturated pressure (Psia) as a function of saturated temperature (° F.) for R-22 refrigerant was calculated as follow:

$$P_{sat}=3.2189\times10^{-5}(T_{sat})^3+5.5892\times10^{-3}(T_{sat})^2+0.82464(T_{sat})+39.192$$

A third order equation for the saturated pressure (Psia) as a function of saturated temperature (° F.) for R-134-A refrigerant was calculated as follow:

$$P(sat)=2.9209E-5(T_{sat})^3+3.5852E-3\,(T_{sat})^2+5.1622E-1(T_{sat})+21.1576$$

Where $T_{sat}$ is the measured refrigerant two-phase temperature, in ° F., and $P_{sat}$ is the refrigerant saturation pressure, in psia. The R-22 equation is valid from about −20° F. to 205° F. and has a maximum error of about +1.2%, while the R-134-A equation is valid from −15° F. to 200° F. and has a maximum error similar to that of the R-22 equation.

ASHRAE provides tables of saturated pressure as a function of the saturated temperature data for most commonly used refrigerants which can be used to generate equations analogous to the one shown above for refrigerants other than R-22 and R-134A. The only assumption in deriving such an equation is that the refrigerant is a single element refrigerant. For mixed refrigerants, the mathematics would be more complex, although solutions would generally be obtainable.

Figure 1:
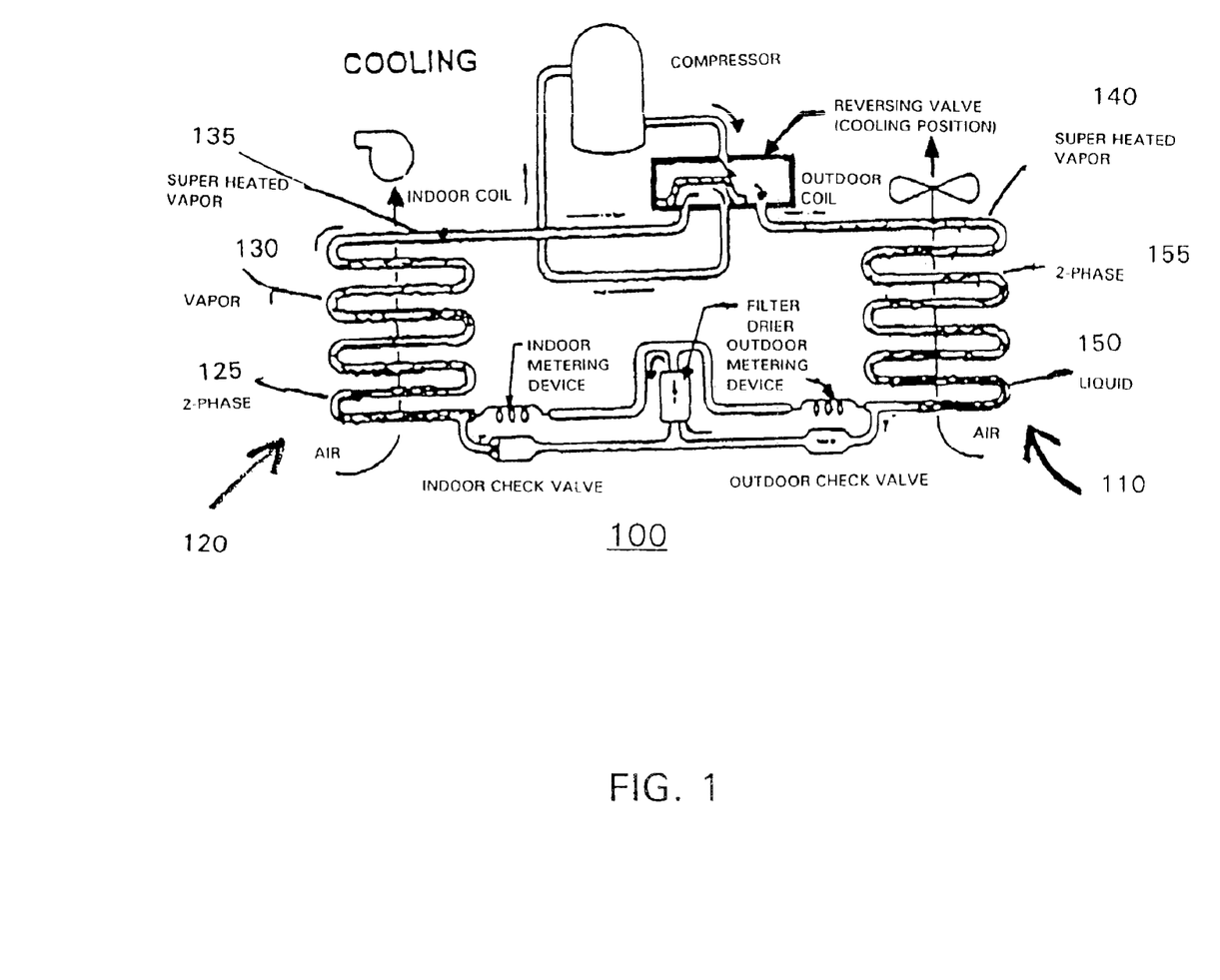
FIG. 1 shows a schematic of an air-to-heat pump system including identification of the refrigerant phase during normal cooling operation along the length of a condenser and an evaporator coil.

The charge indicator can measure at least one condensing coil temperature and/or at least one evaporator coil temperature in their respective two-phase operating regions. FIG. 1 shows a schematic of an air-to-heat pump system 100 including identification of the refrigerant phase during normal cooling operation as a function of location along the lengths of condenser coil 110 and evaporator coil 120, respectively.

As shown in FIG. 1, for the evaporator coil 120, most of the coil length will generally operate in a two-phase region 125, except near the exit end of coil 130. At the extreme end of evaporator coil, the refrigerant is generally entirely a superheated vapor. If the temperature sensor is located at least one "u" bend or after the expansion device down stream of the refrigerant flow, the sensor will generally be measuring a two-phase refrigerant temperature.

As also shown in FIG. 1, condenser coil 110 will generally have only a short section of a superheated (all vapor) region 140 at its input section, with its output generally being all liquid 150, with the balance of the condenser coil length 155 being generally two-phase. Accordingly, when condenser coil temperatures are used, it preferable to obtain temperature measurements near the middle of the condenser coil length 155 to assure a two-phase refrigerant flow region.

Particularly when measuring the condensing coil temperature, it is generally preferable to also provide the ambient temperature. However, when measuring evaporator coil temperatures, the refrigerant charge level may generally be determined accurately without knowledge of the ambient temperatures inside and outside the volume being heated or cooled. The refrigerant charge level can be measured at the evaporator coil without knowledge of the ambient temperature because the evaporator two-phase refrigerant temperature was found to be a weak function of outdoor and indoor temperatures, but a strong function of refrigerant charge.

When temperature measurements are made at the evaporator coil, temperature is not measured at the evaporator exit portion, since the refrigerant could be in an entirely gaseous form in this region. Instead, the evaporator coil temperature is preferably measured in the two-phase evaporator cool region, such as at the second "u" bend from refrigerant inlet to the evaporator coil. In the evaporator two-phase region the evaporator temperature is a strong function of the refrigerant charge, and only a weak function of indoor and outdoor conditions. Accordingly, the refrigerant temperature and cooling capacity drop sharply at the evaporator when the refrigerant charge level is reduced, regardless of the outdoor and indoor temperature conditions. Thus, it can be determined whether the system is properly charged, undercharged, or over-charged from measurement of at least one two-phase refrigerant evaporator coil temperature alone.

In an alternative design, the temperature information is transmitted to a data processing device, such as an appropriate integrated circuit chip, to convert one or more measured temperature readings to a corresponding calculated refrigerant pressure and to perform a comparison between the calculated refrigerant pressure and recommended coil pressure. The recommended coil pressures for both condensers and evaporators can generally be obtained from the refrigerant system manufacturer's charging chart. If the calculated coil pressure obtained from the measured two-phase refrigerant temperature is lower than the recommended pressure, the processing device can provide a suitable signal to show that the system is under-charged.

For example, the response threshold can be set at a (certain preset pressure difference value, such as 5 psi. Upon the detection of a further pressure drop, for example, the processing device can provide a signal to identify that the system has likely developed a leak, and immediate attention is needed.

If the calculated and recommended refrigerant pressures remain within a preset difference value, such as 5 psi, for example, the indicator provided can show that the system is properly charged. Because temperature measurement devices and optional data processing devices can generally be provided and communicably linked (e.g. wired) at low cost, the invention is expected to be inexpensive to produce.

The charge indicator can be an on-the-unit warning system or used as a service tool. For example, with about a 10% refrigerant loss, a warning signal can be used to remind the owner of refrigerant low charge. With about a 20% refrigerant loss, another warning signal can be used to remind the owner that a severe refrigerant leak has been detected.

Coil temperatures can be provided by any suitable temperature sensor. Temperature sensors are commonly referred to as thermometers. Preferred thermometers for use with the invention include resistance temperature detectors (RTD), thermistors, thermocouples and infrared thermometer/pyrometer. Thermocouples provide a voltage output which can eliminate the need for a transducer in embodiments in which a data processing device is used to convert measured temperature data to corresponding refrigerant pressures. Thermistors and thermocouples can generally provide sufficient accuracy for most applications and be provided at a low cost.

Data from one or more temperature sensors can be connected to a data processing device, such as an integrated circuit, using a suitable method for data transmission. In some embodiments, transducers may be required. The temperature sensors can be connected to data processing devices though wired, wireless or optical connections.

Analog data is generally acquired by temperature sensing devices. This data can be digitized into bit streams using analog to digital (A/D) converters, and digitally filtered and encoded by a suitable device, such as a digital signal processor (DSP). This process is analogous to signal processing applied to voice signals in digital cellular communications. One or more modulated digital signals (e.g. from multiple sensors) each having temperature data can be combined into a single digital signal using a multiplexer, converted to an analog signal using a digital to analog (D/A) converter, up-converted in frequency (e.g. a local oscillator), and supplied to a broadband transmitter connected to an antenna for the wireless emission of a single multiplexed signal having the sensor information from a plurality of sensors digitally encoded therein. In this fashion, a single data processing circuit can be used to monitor the refrigerant levels in a plurality of spaced apart refrigerant based systems, such as an apartment complex having hundreds of apartments, each apartment having its own air conditioning system.

Emitted signals can include information to permit sensor locations to be determined from receipt of the signal. Specific carrier frequencies can be identified with specific sensors. Transmitters can also be equipped with GPS. Alternatively, emitted signals from individual sensors can include unique tones which can be identified with individual sensors by reference to a registration list. Transmitted signals can include unique Internet protocol (IP) type addresses permitting identification by reference to a registration list. Time multiplexing can also provide a method for identification of individual sensors from the time of receipt of time synchronized signals, where multiple sensor transmitters can share a given carrier frequency. Many other methods which permit sensor location information to be determined from a received signal will be apparent to those skilled in the art.

In a first embodiment of the invention, the condenser coil temperature (in a two-phase region) is measured. The measured temperature can be converted to a refrigerant pressure using the manufacturers' charging chart or an equation derived therefrom, such as the temperature conversion equation. The charging chart provides a table including proper condenser refrigerant pressures at a certain ambient temperature, which provides recommended refrigerant pressures for the particular refrigerant and air conditioner or heat pump of interest. Heat pump manufacturers generally provide a heat pump refrigerant charging chart for both summer and winter operation. Most of the condenser coil length is generally in a two-phase region. Because in a two-phase region there is only one degree of freedom, once the refrigerant temperature is known, the pressure can be calculated by the temperature conversion equation.

At a certain ambient temperature, a corresponding recommended condenser coil pressure should be reached. By maintaining the ambient temperature and manufacturer specified indoor conditions, usually at the Air Conditioning and Refrigeration Institute specified indoor conditions, refrigerant levels should be maintained at the condenser coil pressures indicated by the chart provided by the system manufacturer or other source. The charge indicator for condenser coils is generally based on measuring both the ambient temperature and the two-phase refrigerant temperature on the condenser coil. Using these temperatures, the condenser coil pressure can be calculated and compared to the recommended pressure to determine the system refrigerant charge level.

Once refrigerant starts leaking from a system, the suction pressure (or suction temperature) starts dropping. This drop causes the discharge pressure (or discharge temperature) to drop as well.

Some units use manufacturer provided charging charts, which involve evaporator (indoor) coil pressure and temperature. In this case, the evaporator coil two-phase region temperature can be obtained optionally along with the indoor ambient temperature. Unlike condenser coil temperatures, evaporator coil pressures can be determined fairly accurately from two-phase evaporator coil temperatures without the need to obtain ambient temperature readings. Thus, it is possible to determine the system charge status by measuring only the evaporator two-phase refrigerant temperature. From this single temperature measurement, it can be determined whether the system is over-charged, under-charged, or a possible leak has developed.

Alternatively, analogous to the above described method of using condenser coil temperatures, the evaporator coil pressure can be calculated from the evaporator coil temperature. The evaporator coil pressure can be compared to the manufacturer's recommended pressure to determine the system refrigerant charge level.

Figure 2:
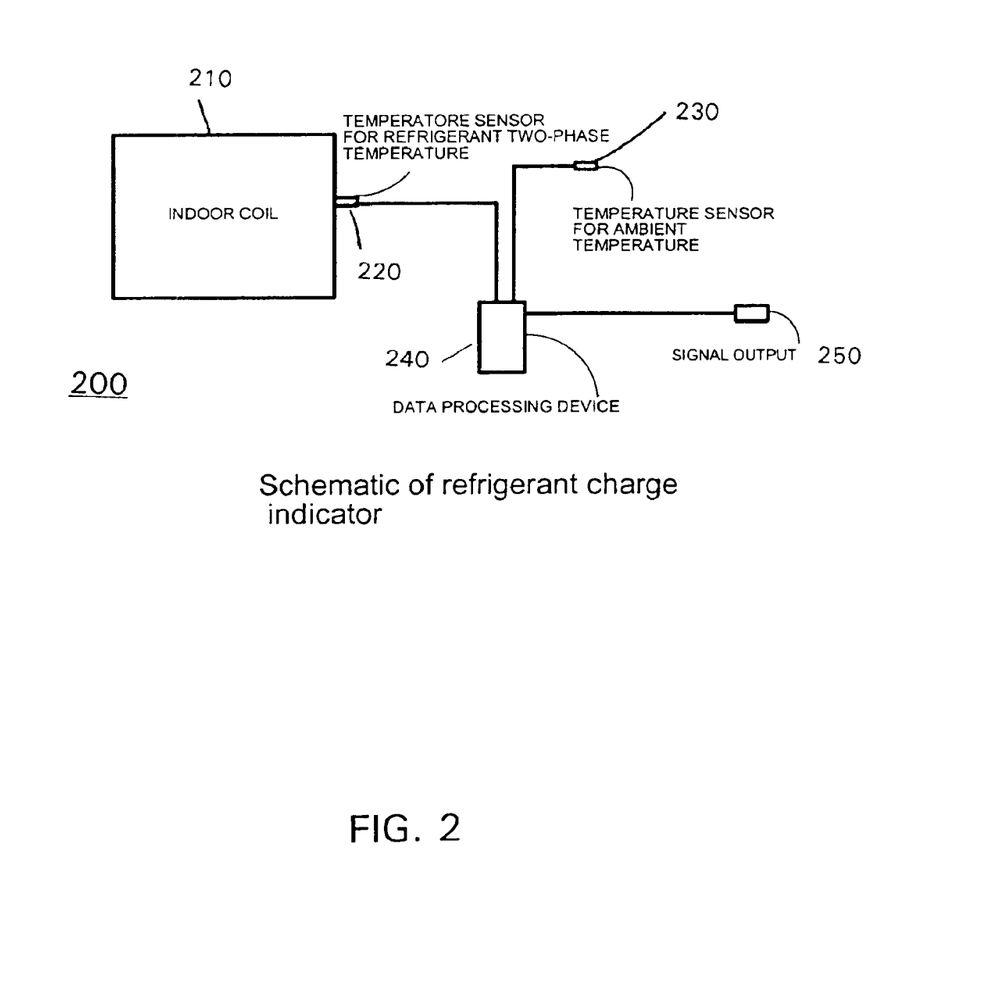
FIG. 2 shows a schematic of a system having a refrigerant charge indicator for sensing the refrigerant temperature at an evaporator coil, according to an embodiment of the invention.

FIG. 2 shows a schematic of a system 200 including a refrigerant charge indicator 210 which senses the refrigerant temperature at a two-phase region of the evaporator coil 210, according to an embodiment of the invention. Temperature sensor 220 is shown disposed on a two-phase region of the evaporator coil. A second optional temperature sensor 230 is shown for optionally measuring the ambient temperature. Data processing device 240, such as a suitable integrated circuit, can receive the temperature information from the temperature sensors 220 and 240 and can convert the temperature information received to a refrigerant pressure at the evaporator coil. The data processing device can be used to compare the calculated refrigerant pressure to the recommended refrigerant pressure to provide a signal output. Data processing device 240 preferably includes suitable memory for storing recommended refrigerant pressure data, generally provided by the system manufacturer.

When the refrigerant system 200 is a heat pump, it will be more accurate to have at least one condenser coil temperature measurement along with the evaporator coil measurement. This is because for heat pump operation the outdoor temperature can vary over a very wide range. A two-temperature measurement can provide more accurate data. However, one temperature measurement can be used.

If the measured coil temperature indicates a refrigerant pressure below a preset minimum pressure, an audible alarm can sound within a homeowner's home. Alternatively, the indicator 200 can trigger the illumination of a warning light to inform the owner that the system is under-charged, and that there is likely a leak in the system.

Figure 3:
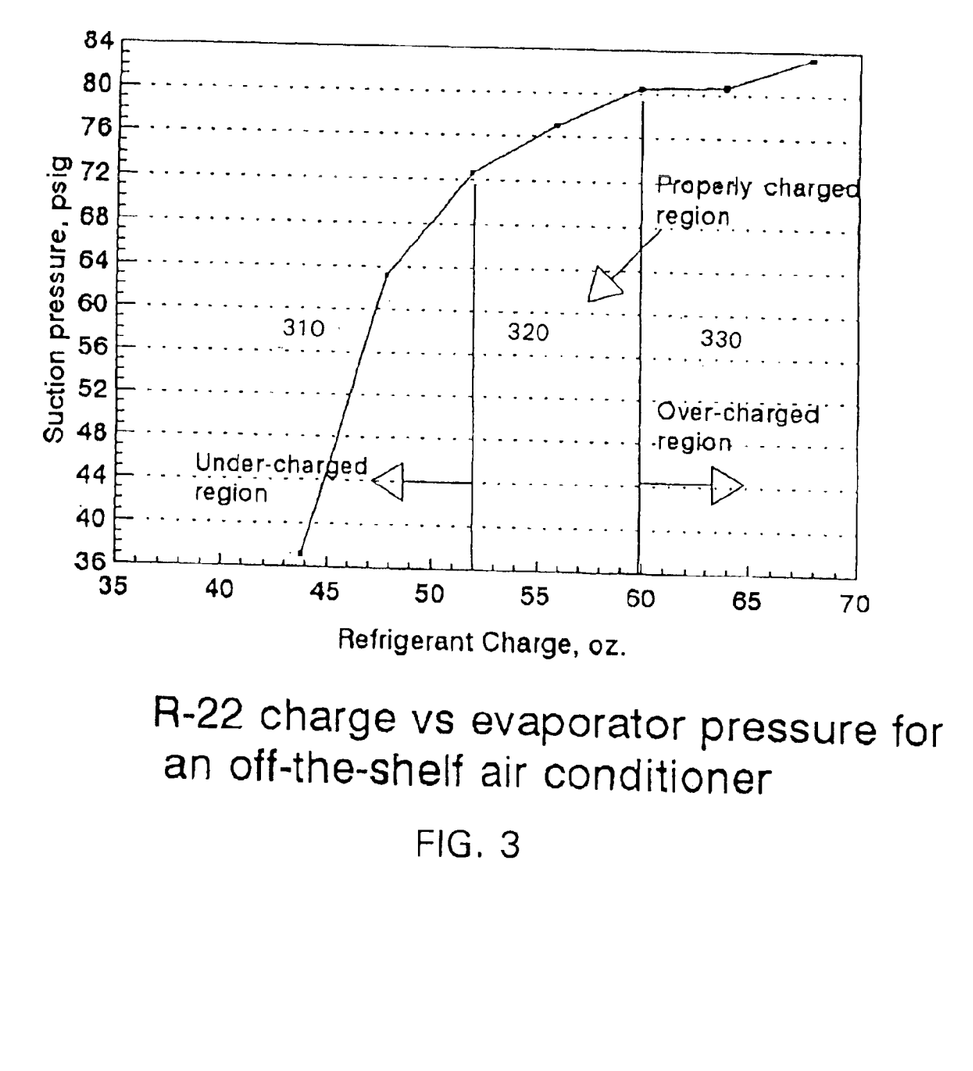
FIG. 3 shows the R-22 refrigerant charge level vs. evaporator pressure compiled by measuring evaporator two-phase refrigerant temperatures.

FIG. 3 shows R-22 charge vs. evaporator suction pressure determined from laboratory tests from an off-the-shelf air conditioner (a two-ton Goodman® window air conditioner, manufactured by the Goodman Manufacturing Company, L. P. Houston, Tex.) by measuring the evaporator two-phase refrigerant temperatures. Tests were conducted at an outdoor temperature of 90° F., indoor temperature of 80° F. and an average relative humidity of 52%. As noted earlier, indoor coil refrigerant two-phase temperatures can generally be measured directly generally without the need for ambient temperature references.

Under the above conditions, FIG. 3 shows an under-charged region 310, properly charged region 320 and over-charged region 330. Thus, by converting the measured evaporator temperature to a corresponding evaporator pressure using an equation such as the temperature conversion equation, a chart such as shown in FIG. 3 can be used to determine whether the refrigerant based system is either under-charged, properly charged, or over-charged. In addition, the amount of refrigerant charge (shown in oz.) for which the system may be either over-charged or under-charged may also be determined.

Figure 4:
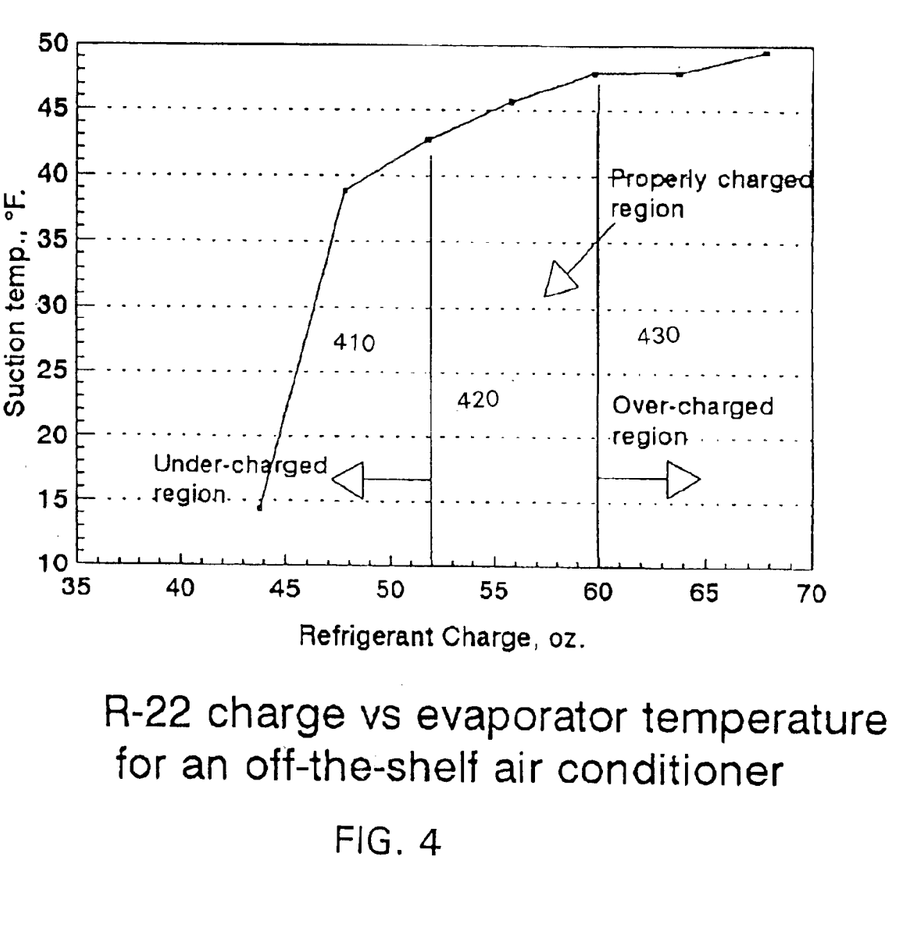
FIG. 4 shows the R-22 refrigerant charge level vs. evaporator temperature.

FIG. 3 shows the R-22 charge level vs. evaporator suction temperature. Laboratory tests performed on an off-the-shelf air conditioner showed that the suction pressures did not vary significantly when the indoor or outdoor temperatures were varied. When a system is under-charged, the evaporator coil refrigerant two-phase temperature (and resulting suction pressure) will become lower than the desired optimum temperature and pressure levels. FIG. 4 shows a properly charged region 420 corresponding to a suction pressure of from 43 to 48° F. Under-charged region 410 can be defined as a suction temperature below 43° F. For any measured suction temperature being below approximately 30° F., it is highly likely that the system is severely under-charged. Over-charged region 430 can be defined as a suction pressure in excess of 50° F. Alternate refrigerants are expected to show similar temperature values as compared to the R-22 values shown above.

FIG. 4 clearly shows that it is possible to determine the system charge status by just measuring one temperature (evaporator two-phase refrigerant temperature). Thus, by just measuring one temperature, it can be determined whether the system is over-charged, under-charged, or a possible leak has developed. FIG. 4 shows that when a 10% charge is lost, the coil temperature will drop to around 40° F.

When 20% of refrigerant is lost, the coil temperature drops to less than 20° F., which corresponds to a cooling capacity loss of 60%. This will provide a clear indication that the system has likely developed a leak, even though about 80% of refrigerant is still in the system.

Heat pump and air conditioner manufactures can provide recommended indoor coil temperatures that correspond to proper refrigerant charges. In this way, the method can be used for heat pump heating mode operation.

Figure 5:
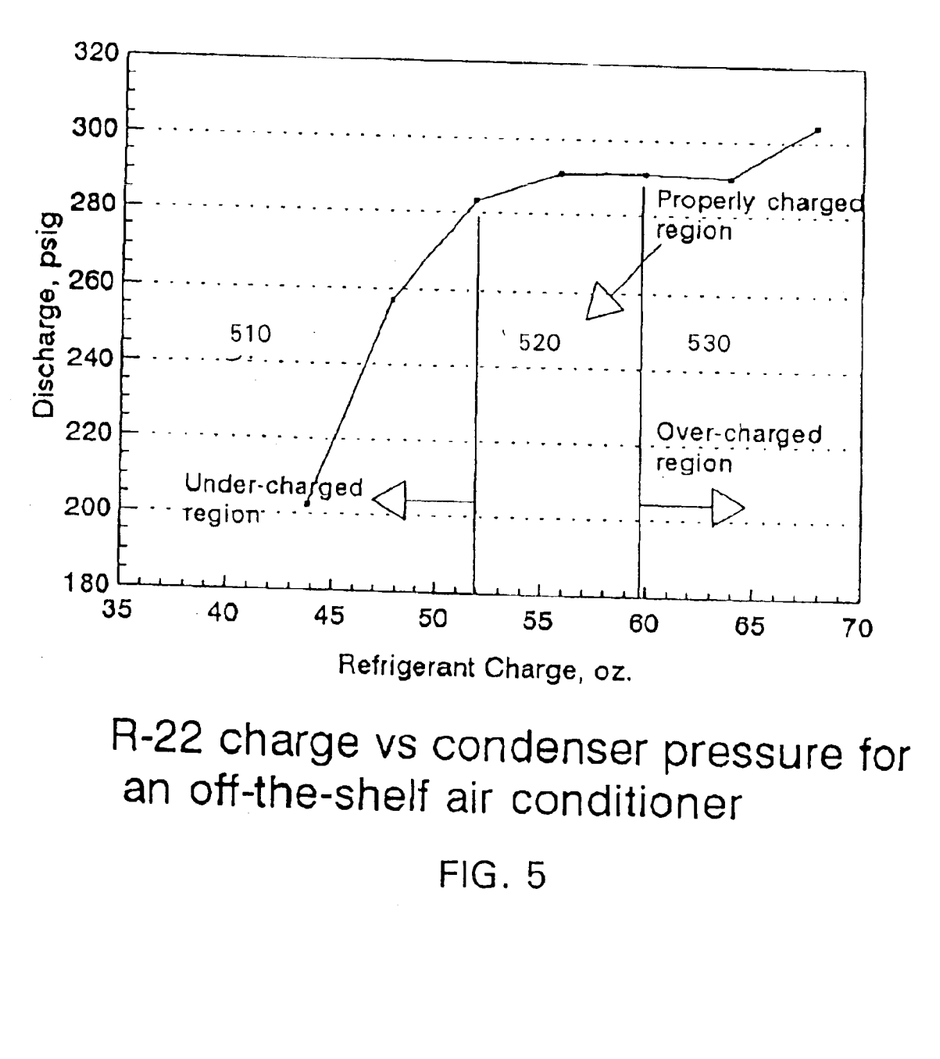
FIG. 5 shows the R-22 refrigerant charge level vs. condenser pressure compiled by measuring condenser two-phase refrigerant temperatures.

Another location in the cooling loop for measuring the system refrigerant charge level is at the condenser coil, the condenser coil generally being located outside the location to be cooled. FIG. 5 shows the R-22 refrigerant charge level vs. condenser pressure compiled by measuring condenser two-phase refrigerant temperatures.

Analogous to the evaporator-based information provided in FIG. 3, FIG. 5 defines an under-charged region 510, properly charged region 520 and over-charged region 530. Thus, by converting the measured condenser temperature to a corresponding condenser pressure using an equation such as the temperature conversion equation, a chart such as shown in FIG. 5 can be used to determine whether the refrigerant based system is either under-charged, properly charged, or over-charged. In addition, the amount of refrigerant charge (shown in oz.) for which the system may be either over-charged or under-charged may also be determined.

Unlike evaporator coil temperature readings, condenser coil temperature measurements should generally be accompanied by ambient temperature measurements when conversion to a corresponding condenser coil pressure is desired. However, for mobile air conditioning systems, usually only a single condenser coil temperature measurement is necessary because most vehicles already provide ambient temperature indicators which may be utilized by the invention.

Both condenser coil and evaporator coil two-phase refrigerant temperature measurements can be simultaneously measured and combined together to produce a system and method having improved diagnostic ability. One advantage of obtaining both condenser coil and evaporator coil temperatures is to provide a double check on the charge status.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A non-intrusive indicator for measuring charging levels of a refrigerant, comprising:

a temperature sensor for measuring a temperature at an outside surface of at least one two-phase refrigerant line section, said line section having said refrigerant flowing therethrough during measurement of said temperature, and structure for determining a charging level of said refrigerant from said temperature exclusive of temperature or pressure measurements from any single-phase refrigerant line section, wherein said structure for determining a charging level includes an integrated circuit-based data processing device which converts said temperature to a pressure of said refrigerant in said line section and includes a recommended pressure range for said refrigerant stored within, said data processing device comparing said pressure of said refrigerant in said line section to said recommended pressure range.

2. The refrigerant charge level indicator of claim 1, further comprising a structure for measurement of ambient temperature, wherein said data processing service includes said ambient temperature in conversion of said temperature to said pressure of said refrigerant in said line section.

3. The refrigerant charge level indicator of claim 1, wherein said temperature is measured at a condenser coil surface.

4. The refrigerant charge level indicator of claim 3, wherein said temperature is measured at a discharge of said condenser.

5. The refrigerant charge level indicator of claim 1, wherein said temperature is obtained at a single instant in time and is exclusively used by said structure for determining to directly determine said charging level.

6. The refrigerant charge level indicator of claim 1, wherein said pressure of said refrigerant in said line section is determined exclusively using a single evaporator coil temperature measurement, whereby an ambient temperature value is not required.

7. The refrigerant charge level indicator of claim 1, wherein said temperature comprises a condenser coil temperature and an evaporator coil temperature.

8. The refrigerant charge level indicator of claim 1, wherein said indicator determines an amount of said refrigerant which has been lost.

9. The refrigerant charge level indicator of claim 1, wherein said indicator includes a structure for generating at least one output signal to indicate when said pressure of said refrigerant in said line section is outside said recommended pressure range.

10. The refrigerant charge level indicator of claim 9, wherein said output signal is an audio or a visual signal.

11. A refrigerant based heating or cooling system, comprising:
a compressor, condenser and an evaporator fluidicly connected by a refrigerant line filled with a refrigerant fluid;
a temperature sensor for measuring a temperature at an outside surface of at least one two-phase region of said refrigerant line, said line section having said refrigerant flowing therethrough during measurement of said temperature, and structure for determining a charging level of said refrigerant from said temperature exclusive of temperature or pressure measurements from any single-phase refrigerant line section, wherein said structure for determining a charging level includes an integrated circuit-based data processing device which converts said temperature to a pressure of said refrigerant in said line section and includes a recommended pressure range for said refrigerant stored within, said data processing device comparing said pressure of said refrigerant in said line section to said recommended pressure range.

12. The system of claim 11, further comprising a temperate sensor for measurement of ambient temperature, wherein said data processing device converts a differential temperature measurement including said ambient temperature to said pressure of said refrigerant in said line section.

13. The system of claim 11, wherein said temperature is measured at a coil surface of said condenser.

14. The system of claim 13, wherein said temperature is measured at a discharge of said condenser.

15. The system of claim 11, wherein said temperature is obtained at a single instant in time and is exclusively used by said structure for determining to directly determine said charging level.

16. The system of claim 11, wherein said pressure of said refrigerant in said line section is determined exclusively using a single evaporator coil temperature measurement, whereby an ambient temperature value is not required.

17. The system of claim 11, wherein said temperature comprises a condenser coil temperature and an evaporator coil temperature.

18. The system of claim 11, wherein said structure for determining a charging level determines an amount of said refrigerant which has been lost.

19. The system of claim 11, wherein said system includes a structure for generating at least one output signal to indicate when said pressure of said refrigerant in said line section is outside said recommended pressure range.

20. The system of claim 19, wherein said output signal is an audio or a visual signal.

21. The system of claim 11, wherein said system comprises an air conditioning system or heat pump system.

22. The system of claim 11, wherein said system heats or cools a movable volume.

23. The system of claim 22, wherein said movable volume is at least one selected from the group consisting of an aircraft, a car, a truck, a train and a water going vessel.

24. The system of claim 11, wherein system heats or cools a non-movable volume.

* * * * *